United States Patent
Ryu et al.

(10) Patent No.: US 9,183,449 B2
(45) Date of Patent: Nov. 10, 2015

(54) APPARATUS AND METHOD FOR DETECTING OBSTACLE

(71) Applicant: Hyundai Motor Company, Seoul (KR)

(72) Inventors: Seong Sook Ryu, Seoul (KR); Jae Seob Choi, Hwaseong (KR); Eu Gene Chang, Gunpo (KR)

(73) Assignee: Hyundai Motor Company, Seoul (KR)

( * ) Notice: Subject to any disclaimer, the term of this patent is extended or adjusted under 35 U.S.C. 154(b) by 161 days.

(21) Appl. No.: 14/099,157

(22) Filed: Dec. 6, 2013

(65) Prior Publication Data

US 2015/0063647 A1 Mar. 5, 2015

(30) Foreign Application Priority Data

Sep. 5, 2013 (KR) .................. 10-2013-0106719

(51) Int. Cl.
*G06K 9/00* (2006.01)
*G06T 7/20* (2006.01)

(52) U.S. Cl.
CPC .......... *G06K 9/00805* (2013.01); *G06T 7/2006* (2013.01); *G06T 7/2053* (2013.01); *G06T 2207/20224* (2013.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 7,899,211 B2* | 3/2011 | Fujimoto | | 382/104 |
| 8,699,754 B2* | 4/2014 | Zhang et al. | | 382/104 |
| 2003/0091228 A1* | 5/2003 | Nagaoka et al. | | 382/154 |
| 2005/0165550 A1* | 7/2005 | Okada | | 701/301 |
| 2005/0196020 A1* | 9/2005 | Comaniciu et al. | | 382/104 |
| 2005/0225636 A1* | 10/2005 | Maemura et al. | | 348/148 |
| 2006/0140447 A1* | 6/2006 | Park et al. | | 382/104 |
| 2007/0206833 A1 | 9/2007 | Otsuka et al. | | |
| 2008/0199043 A1* | 8/2008 | Forsgren | | 382/103 |
| 2008/0317287 A1* | 12/2008 | Haseyama | | 382/103 |
| 2010/0060487 A1* | 3/2010 | Augst | | 340/937 |
| 2010/0097455 A1* | 4/2010 | Zhang et al. | | 348/119 |
| 2010/0121577 A1* | 5/2010 | Zhang et al. | | 701/301 |
| 2013/0070095 A1* | 3/2013 | Yankun et al. | | 348/148 |
| 2013/0070962 A1* | 3/2013 | Yankun et al. | | 382/103 |
| 2014/0168440 A1* | 6/2014 | Tsuchiya et al. | | 348/148 |

FOREIGN PATENT DOCUMENTS

| | | |
|---|---|---|
| JP | 09-097395 | 4/1997 |
| JP | 2006-304818 A | 11/2006 |
| JP | 2007-235642 A | 9/2007 |

(Continued)

*Primary Examiner* — Barry Drennan
*Assistant Examiner* — Alexander J Lesnick
(74) *Attorney, Agent, or Firm* — Mintz Levin Cohn Ferris Glovsky and Popeo, P.C.; Peter F. Corless (57) ABSTRACT

An apparatus and a method for detecting an obstacle are provided. The apparatus includes a memory configured to store program instructions and a processor that is configured to execute the program instructions. The program instructions when executed are configured to compensate a position of a second image based on a first image based on a moving distance of a vehicle between the first image and the second image captured at different times and respectively generate a difference image based on a difference between the first image and the second image and between the first image and the second image in which the position is compensated. In addition, binarization is performed of the difference image and a synthetic image is generated for the two difference images. Then, the obstacle is detected by selecting a pixel corresponding to an area where the bit value is detected from the synthetic image.

10 Claims, 7 Drawing Sheets

(56) References Cited

FOREIGN PATENT DOCUMENTS

| | | |
|---|---|---|
| JP | 04-134316 B2 | 8/2008 |
| JP | 2008-227646 A | 9/2008 |
| JP | 2011-103058 A | 5/2011 |
| KR | 10-2003-0024354 A | 3/2003 |
| KR | 10-0954884 B1 | 4/2010 |

* cited by examiner

APPARATUS AND METHOD FOR DETECTING OBSTACLE

CROSS-REFERENCE TO RELATED APPLICATION

This application claims the benefit of priority to Korean Patent Application No. 10-2013-0106719, filed on Sep. 5, 2013 in the Korean Intellectual Property Office, the disclosure of which is incorporated herein in its entirety by reference.

TECHNICAL FIELD

The present invention relates to an apparatus and a method that detect an obstacle, and more particularly, to a technology that detects an obstacle using a difference between two images.

BACKGROUND

Generally, a technology that detects an obstacle of a vehicle uses an ultrasonic sensor disposed within the vehicle. However, the ultrasonic sensor may not detect the obstacle accurately based on the positioning of the sensor within the vehicle and surrounding environment. In addition, when detecting the obstacle, the ultrasonic sensor may incorrectly detect the obstacle where there no obstacle is present due to an unevenness of the ground or sound source disturbance to generate a false alarm. Hence, reliability related to the obstacle detection may be degraded.

Further, when detecting the obstacle using the ultrasonic sensor, the obstacle may be detected only in a direction in which the ultrasonic sensor is mounted. To detect the obstacle in all directions of the vehicle, the ultrasonic sensor should be mounted in all directions of the vehicle.

SUMMARY

The present invention provides an apparatus and a method for detecting an obstacle that detect the obstacles around the vehicle after removing a shadow area using a difference according to a vehicle movement between top-view images of different points of view.

In accordance with an aspect of the present invention, an apparatus for detecting an obstacle may include: a position compensator configured to compensate a position of a second image based on a first image based on a moving distance of a vehicle between the first image and the second image captured at different times; a difference image generator configured to respectively generate a difference image according to a difference between the first image and the second image and between the first image and the second image in which the position is compensated; a computator configured to perform binarization of the difference image based on a difference value of each difference image and to generate a synthetic image for the two difference images based on a bit value of pixels corresponding to each other between the two binarized difference images; and an obstacle detector configured to detect the obstacle by selecting a pixel that corresponds to an area where the bit value is detected from the synthetic image. The difference image generator may be configured to generate a first difference image based on a difference between the first image and the second image, and a second difference image according to a difference between the first image and the second image in which the position is compensated.

In accordance with an aspect of the present invention, an apparatus for detecting an obstacle may further include: a difference map generator configured to respectively generate a difference map that corresponds to the first difference image and the second difference image. The computator may be configured to binarize the first difference image and the second difference image based on a difference value of each area in the difference map that corresponds to the first difference image and the second difference image. The computator may be configured to binarize the pixel of the area having the difference value greater than a reference value into 1 bit and the pixel of the area having the difference value of a reference value or less into 0 bit in the difference map that corresponds to the first difference image and the second difference image. The computator may be configured to perform an AND operation for the bit values of the two pixels corresponding to each other between binarization images of the first difference image and the second difference image to generate a synthetic image for the binarization images. The obstacle detector may be configured to extract the area in which the bit value is 1 in the synthetic image, and detect the obstacle by selecting the pixel that corresponds to the extracted area in the difference map of the first difference image or the second difference image. The obstacle detector may be configured to select surrounding areas m, x and n of the pixel selected from the difference map of the First difference image and the second difference image and detect the obstacle from the selected area.

In accordance with another aspect of the present invention, a method for detecting an obstacle may include: compensating a position of a second image based on a first image based on a moving distance of a vehicle between the first image and the second image of different times; generating a first difference image based on a difference between the first image and the second image, and generating a second difference image based on a difference between the first image and the second image in which the position is compensated; generating a difference map for each of the first difference image and the second difference image; performing binarization of the first difference image and the second difference image based on a difference value of the difference map; performing an AND operation for a bit value of two pixels corresponding to each other in the binarization image of the first difference image and the second difference image and generating a synthetic image for the binarization image; and extracting an area in which the bit value is 1 in the synthetic image and detecting the obstacle by selecting a pixel that corresponds to the extracted area in the difference map of the first difference image or the second difference image.

BRIEF DESCRIPTION OF THE DRAWINGS

The objects, features and advantages of the present invention will be more apparent from the following detailed description in conjunction with the accompanying drawings, in which:

FIGS. 2A to 7 are exemplary diagrams describing an operation of an apparatus for detecting an obstacle according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
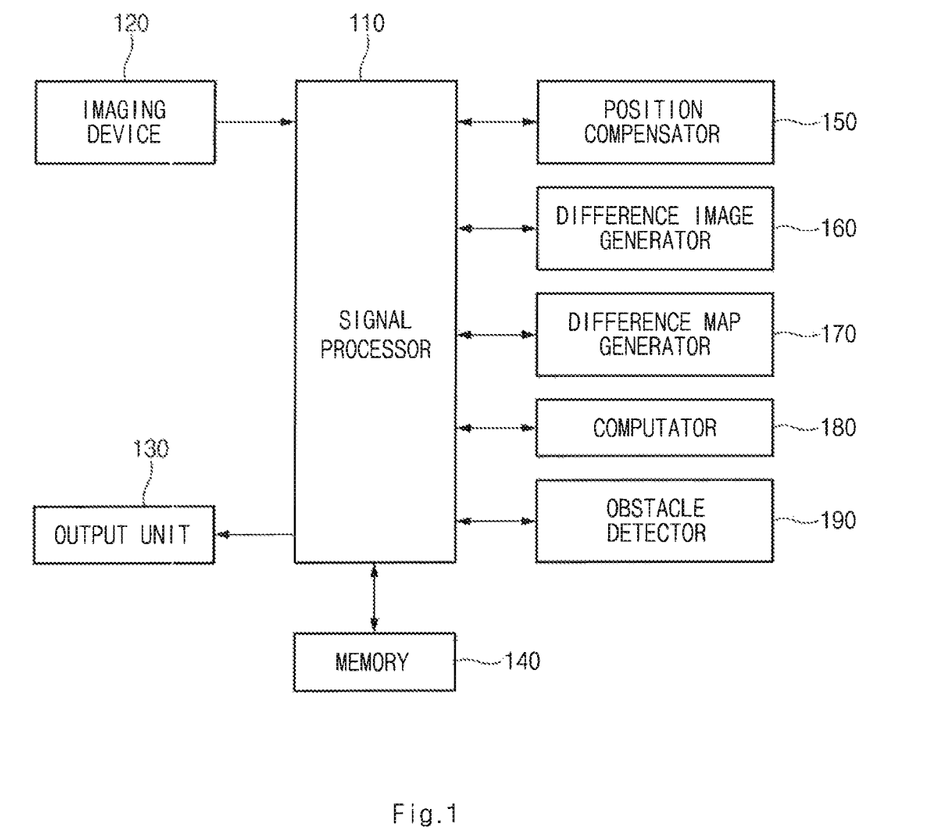
FIG. 1 is an exemplary block diagram illustrating a configuration of an apparatus for detecting an obstacle according to an exemplary embodiment of the present invention.

FIG. 1 is an exemplary block diagram illustrating a configuration of an apparatus for detecting an obstacle according to an exemplary embodiment of the present invention. Referring to FIG. 1, the apparatus for detecting the obstacle may include a signal processor 110, an imaging device 120, an output unit 130, a memory 140, a position compensator 150, a difference image generator 160, a difference map generator 170, a computator 180 and an obstacle detector 190. Further, the signal processor 110 may be configured to execute a signal flow between each part of the apparatus for detecting the obstacle. The signal processor 110 may be configured to execute the position compensator 150, the difference image generator 160, the difference map generator 170, the computator 180, the obstacle detector 190, and the output unit 130.

The imaging device 120 (e.g., a camera, a video camera, or the like) disposed within a vehicle, may be an imaging device disposed in a front, a rear, a left and a right of the vehicle and may be configured to capture an image around the vehicle. In particular, the imaging device 120 may be configured to continuously capture the image around the vehicle and provide a first image and a second image photographed at different times. The first image may be an image captured at current time and the second image may be an image captured at an earlier time period than the first image. In addition, the first image and the second image, which may be top-view images of a front, a rear, a left and a right of the vehicle, may be used by synthesizing and view-converting the images of a front, a rear, a left and a right of the vehicle captured by the imaging device 120. Meanwhile, when an around view monitor (AVM) system is disposed within the vehicle, the top-view image may be provided from the AVM system.

The output unit 130, which may be configured to output an operating state and a detected result of the apparatus for detecting the obstacle, may be a display such as a monitor, a navigation screen, or the like disposed within the vehicle and an audio output such as a speaker and a buzzer.

The memory 140 may be configured to store a preset value for an operating of the apparatus for detecting the obstacle and an image obtained from the imaging device 120. In addition, the memory 140 may also be configured to store an algorithm applied when generating the difference image, the difference map, and the like. The position compensator 150 may be configured to compensate the position of the second image based on the first image based on a moving distance of the vehicle calculated from a time when the first image is captured using a control area network (CAN) data until the second image is captured. In particular, the position compensator 150 may be configured to calculate a moving distance of the vehicle between the two images using the CAN information of the vehicle, for example, a wheel radius (R) of the vehicle, a wheel circumference (211R) of the vehicle, the number of saw teeth (N) of a rear wheel of the vehicle and a wheel pulse value (P) based on the movement of the vehicle between the two images.

The difference image generator 160 may be configured generate the difference image based on the difference between the first image, the second image and the second image in which the position is compensated. In particular, the difference image generator 160 may be configured to generate the first difference image based on the difference between the first image and the second image and the second difference image according to the difference between the first image and the second image in which the position is compensated. The difference image generator 160 may be configured to generate the first difference image and the second difference image by calculating the difference of pixel values (e.g., hue, brightness, chroma, and the like) of corresponding pixels between the first image, the second image and the second image in which the position is compensated.

Figure 4A:
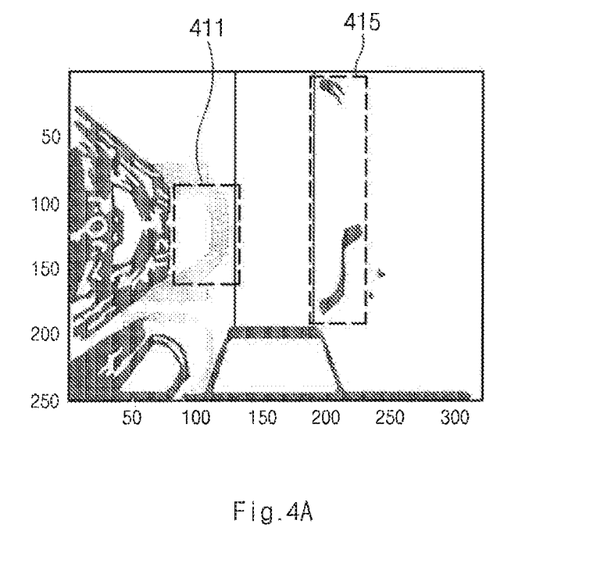
Figure 4B:
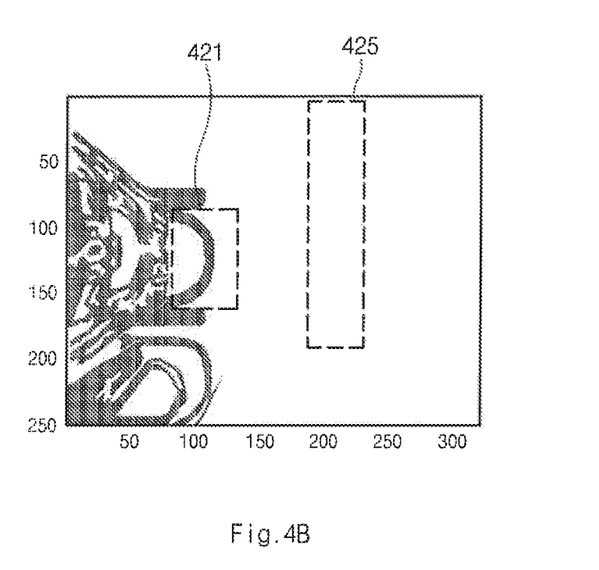

The difference map generator 170 may be configured to generate the difference map for the first difference image and the second difference image generated by the difference image generator 160. In particular, the difference map generator 170 may be configured to generate the difference map for the first difference image and the second difference image using a census transform algorithm. Further, any algorithm that generates the difference map for a specific image in addition to the census transform algorithm may be applied. The exemplary embodiment for the difference map generated by the difference map generator 170 will be described with reference to FIG. 4.

The computator 180 may be configured to binarize the first difference image and the second difference image based on the difference values of the first difference image and the second difference image, respectively. In particular, the computator 180 may be configured to binarize the first difference image and the second difference image for the two difference maps generated by the difference map generator 170 based on the difference value of each area.

Figure 5A:
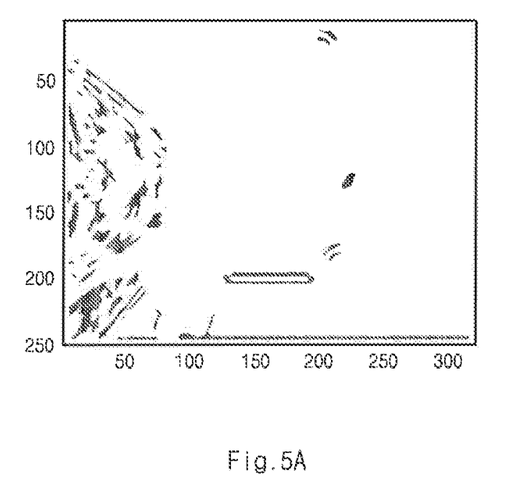
Figure 5B:
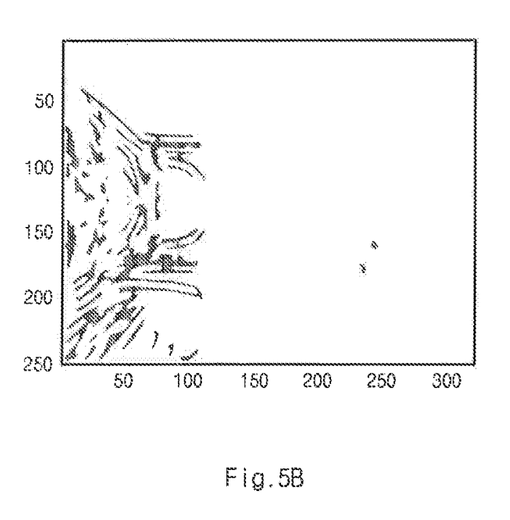

As an example, the computator 180 may be configured to binarize the pixel of the area having the difference value greater than a reference value into 1 bit and the pixel of the area having the difference value equal to or less than a reference value into 0 bit in the difference map that corresponds to the first difference image. Similarly, the computator 180 may be configured to binarize the pixel of the area having the difference value greater than a reference value into 1 bit and the pixel of the area having the difference value equal to or less than a reference value into 0 bit in the difference map that corresponds to the second difference image. The exemplary embodiment for binarization images of the first difference image and the second difference image will be described with reference to FIG. 5.

Moreover, the computator 180 may be configured to an AND operation for the bit values of the two pixels corresponding to the two binarization images that correspond to the first difference image and the second difference image. As a performance results of the AND operation, the computator 180 may be configured to generate a synthetic image for the two binarization images. The exemplary embodiment; for the synthetic image for the two binarization images will be described with reference to FIG. 6.

The obstacle detector 190 may be configured to extract the area where the bit value is detected, that is, the 1 bit area in the synthetic image generated by the computator 180. In particular, the extracted 1 bit area may be a common area of the difference map of the first difference image and the difference map of the second difference image. Therefore, the obstacle detector 190 may be configured to detect the obstacle by selecting the pixel that corresponds to the 1 bit area extracted from the synthetic image in the difference map of the first difference image or the second difference image. Meanwhile, the obstacle detector 190 may be configured to select m×n areas around the pixel which is selected corresponding to the 1 bit area of the synthetic image in the difference map of the first difference image or the second difference image and may detect the obstacle from the selected areas. The exemplary embodiment for the obstacle detection area will be described with reference to FIG. 7.

Figure 2A:
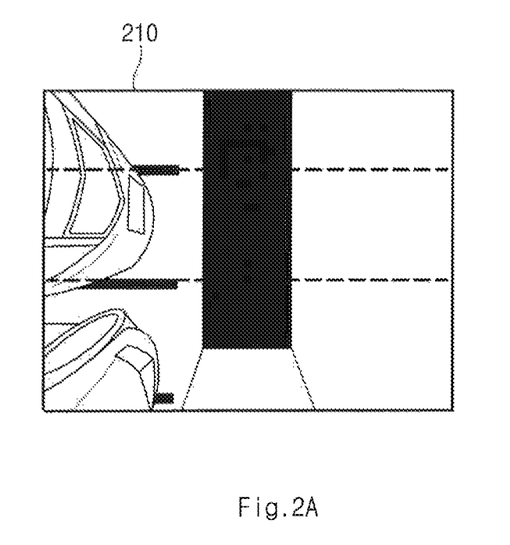

FIGS. 2A to 3B are exemplary diagrams describing a position compensation operation of an apparatus for detecting an obstacle according to an exemplary embodiment of the present invention. In particular, FIGS. 2A-2B show exemplary original images of the two images obtained at the two different times. FIG. 2A shows the exemplary original image of the first image and FIG. 2B shows the exemplary original image of the second image.

Figure 2B:
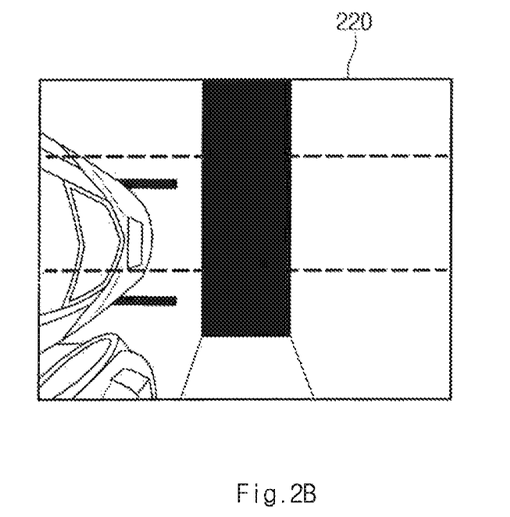

Since the top-view image obtained from the vehicle may be synthesized by view-converting the images captured at a front, a rear, a left and a right of the vehicle based on the vehicle position, for the original images of the first image and the second image obtained at the two different times as shown in FIGS. 2A and 2B, the vehicle being driven may be disposed in the substantially same position on the image. Accordingly, even though the original images of the first image and the second image may include the same object, the positions of the corresponding object in the two images may be different from each other. In other words, the parking division lines included in the second image may be positioned below extension lines in which the parking division lines included in the first image are extended in a horizontal direction in FIGS. 2A and 2B.

Figure 3A:
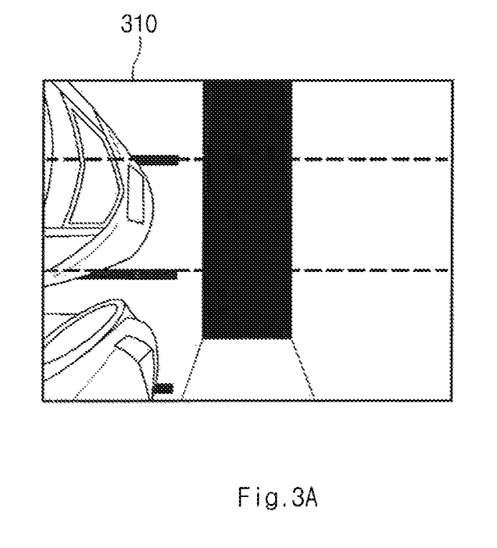
Figure 3B:
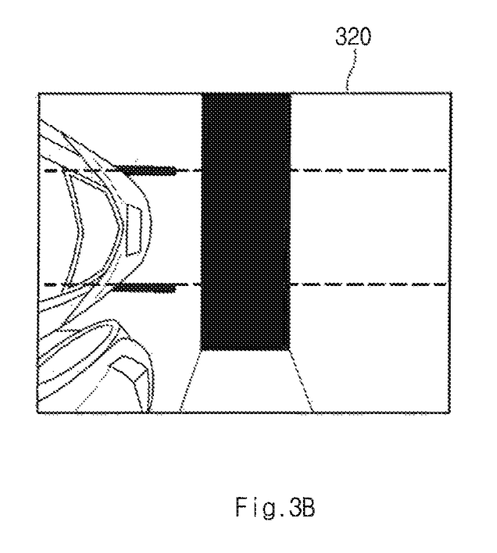

Furthermore, FIGS. 3A-3B show exemplary images that compensate the positions of the two images obtained at the two different times. FIG. 3A shows the exemplary original image of the first image and FIG. 3B shows the exemplary original image of the second image in which the position is compensated. In particular, the apparatus for detecting the obstacle may move the position of the second image based on a distance moving from the time when the second image is captured until the time when the first image is captured in FIGS. 2A-2B.

FIGS. 4A-4B are exemplary diagrams describing a difference map according to an exemplary embodiment of the present invention. In particular, FIG. 4A shows the exemplary difference map for the second difference image generated between the first image and the second image in which the position is compensated in FIGS. 3A-3B, and FIG. 4B shows the exemplary difference map for the second difference image generated between the original images of the first image and the second image in FIGS. 2A-2B.

For the first image and the second image in which the position is compensated, a shadow position of the around vehicle may be substantially the same and a shadow position of the vehicle being driven may be different. Therefore, as shown in FIG. 4A, a shadow of the around vehicle may not be detected in a shadow area 411 of the vehicle parked within the parking division lines, whereas a shadow of the vehicle being driven may be detected in a shadow area 415 of the vehicle being driven in the difference map of the second difference image.

Moreover, since the original images of the first image and the second image may be obtained based on the position of the vehicle being driven, the shadow position of the vehicle being driven may be substantially the same and the shadow position of the vehicle parked within the parking division lines may be different in the first image and the second image. Therefore, as shown in FIG. 4B, a shadow of the vehicle parked within the parking division lines may be detected in a shadow area 421 of the vehicle parked in the parking division lines, whereas a shadow of the vehicle being driven may not be detected in a shadow area 425 of the vehicle being driven in the difference map of the first difference image.

Figure 6:
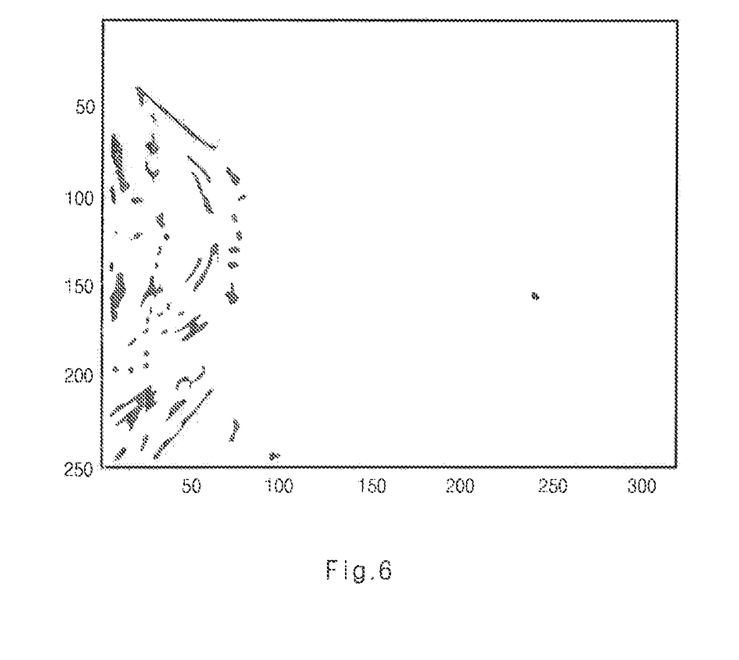

FIGS. 5A-6 are exemplary diagrams describing a calculating operation using a difference map of FIGS. 5A-5B. In particular, FIGS. 5A-5B show exemplary binarization images of the difference map of the first difference image and the second difference image, and FIG. 6 shows an exemplary synthetic image for the binarization images of FIGS. 5A-5B.

First, referring to FIGS. 5A-5B, the apparatus for detecting the obstacle may be configured to generate the binarization image for the difference map of the second difference image as shown in FIG. 5A by binarizing the pixel that corresponds to the area having the difference value greater than the reference value into 1 bit and the pixel that corresponds to the area having the difference value equal to or less than a reference value into 0 bit based on the difference value of the difference map shown in FIG. 4A. Similarly, the apparatus for detecting the obstacle may be configured to generate the binarization image for the difference map of the first difference image as shown in FIG. 5B by binarizing the pixel that corresponds to the area having the difference value greater than the reference value into 1 bit and the pixel that corresponds to the area having the difference value equal to or less than a reference value into 0 bit based on the difference value of the difference map shown in FIG. 4B.

In particular, the apparatus for detecting the obstacle may be configured to perform the AND operation to correspond bit values of the two pixels in the two binarization images shown in FIGS. 5A and 5B, and generate the synthetic image for the binarization image as shown in FIG. 6 with reference to the position of the pixel that corresponds to True in Boolean value obtained by result of binarization. As shown in FIG. 6, the synthetic image for the binarization image may be configured with 1 and 0 bit, and, in this case, the 1 bit area is indicated as dashed line.

Figure 7:
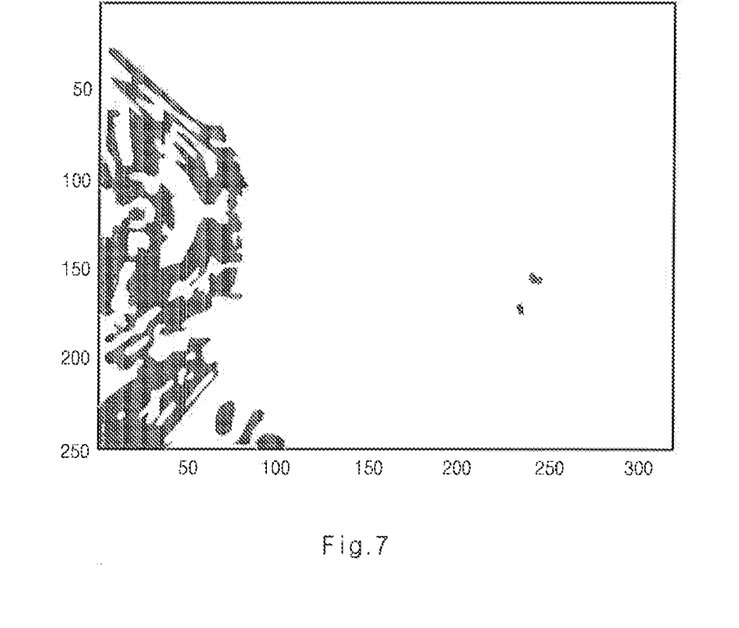

FIG. 7 is an exemplary diagram describing an operation for detecting the obstacle in the apparatus for detecting the obstacle according to the exemplary embodiment of the present invention. The apparatus for detecting the obstacle may be configured to select the pixel that corresponds to the 1 bit area displayed as dashed line in the synthetic image of FIG. 6 from the difference map of the first difference image or the second difference image, and may be configured to detect the obstacle from the selected area by selecting m×n areas around the selected pixel.

An operation flow of a method for detecting an obstacle according to an exemplary embodiment of the present invention will be described in more detail.

Figure 8:
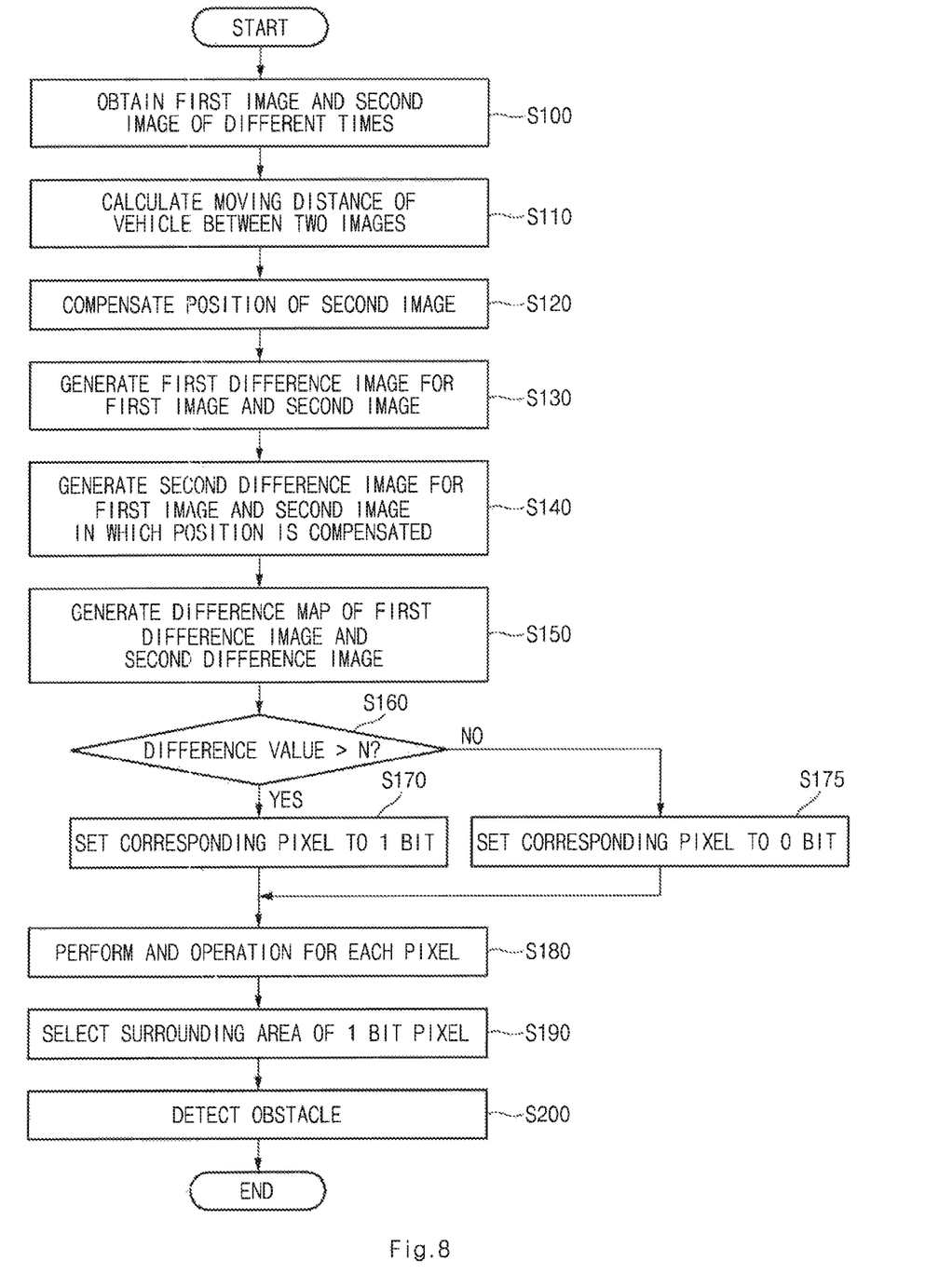
FIG. 8 is an exemplary flow chart illustrating a flow of operation for a method for detecting an obstacle according to an exemplary embodiment of the present invention.

FIG. 3 is an exemplary flow chart illustrating a flow of operation for a method for detecting an obstacle according to an exemplary embodiment of the present invention. Referring to FIG. 8, the apparatus, executed by a controller, for detecting the obstacle may be configured to obtain the first image and the second image at two difference times (S100), calculate a moving distance of the vehicle between the two images obtained at step S100 (S110) and compensate a position of the second image based on the moving distance calculated at step S110 (S120). The apparatus for detecting the obstacle may be configured to compensate the position of the second image based on the first image.

The apparatus for detecting the obstacle may be configured to generate the first difference image based on the difference of the first image and the second image (S130), and generate the second difference image based on the difference between the first image and the second in which the position is compensated at step S120 (S140). Thereafter, the apparatus for detecting the obstacle may be configured to generate the difference map that corresponds to each of the first difference image generated at step S130 and the second difference image generated at step S140 (S150), compare the difference value of the difference map generated at step S150 with the reference value N (S160), binarize the pixel having the difference value greater than the reference value N into 1 bit (S170), and binarize the pixel having the difference value equal to or less than the reference value N into 0 bit (S175).

In particular, the apparatus for detecting the obstacle may be configured to perform the AND operation for the bit values of the corresponding pixels in the binarization image generated by the binarization operation at steps S170 and S175 (S180). The synthetic image for the two binarization images may be generated at step S180. The apparatus for detecting the obstacle may further be configured to select the surrounding area, for example, the m, x and n areas of the pixel corresponding to the area in which the bit value is 1 in the synthetic image from the difference map of the first difference image 2Q or the second difference image (S190), and detect the obstacle from the area selected at step S190 (S200).

As set force above, the apparatus for detecting the obstacle according to the exemplary embodiment of the present invention may be configured to detect the obstacles around the vehicle after removing a shadow area using the difference based on the vehicle movement between top-view images of the different points of view, to prevent the misdetection of obstacle due to shadow and to detect the obstacle in all directions of the vehicle.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the accompanying claims.

What is claimed is:

1. An apparatus for detecting an obstacle, comprising:
a memory configured to store program instructions; and
a processor configured to execute the program instructions, the program instructions when executed configured to:
compensate a position of a second image based on a first image based on a moving distance of a vehicle between the first image and the second image captured at different times;
respectively generate a difference image based on a difference between the first image and the second image and between the first image and the second image in which the position is compensated;
perform binarization of the difference image based on a difference value of each difference image;
generate a synthetic image for the two difference images based on a bit value of corresponding pixels between the two binarized difference images; and
detect the obstacle by selecting a pixel that corresponds to an area where the bit value is detected from the synthetic image.

2. The apparatus of claim 1, wherein the program instructions when executed are further configured to:
generate a first difference image based on a difference between the first image and the second image, and a second difference image based on a difference between the first image and the second image in which the position is compensated.

3. The apparatus of claim 2, wherein the program instructions when executed are further configured to:
respectively generate a difference map that corresponds to the first difference image and the second difference image.

4. The apparatus of claim 3, wherein the program instructions when executed are further configured to:
binarize the first difference image and the second difference image based on a difference value of each area in the difference map that corresponds to the first difference image and the second difference image.

5. The apparatus of claim 4, wherein the program instructions when executed are further configured to:
binarize the pixel of the area having the difference value greater than a reference value into 1 bit and the pixel of the area having the difference value equal to or less than a reference value into 0 bit in the difference map that corresponds to the first difference image and the second difference image.

6. The apparatus of claim 5, wherein the program instructions when executed are further configured to:
perform an AND operation for the bit values of the two corresponding pixels between binarization images of the first difference image and the second difference image to generate a synthetic image for the binarization images.

7. The apparatus of claim 6, wherein the program instructions when executed are further configured to:
extract the area in which the bit value is 1 in the synthetic image; and
detect the obstacle by selecting the pixel that corresponds to the extracted area in the difference map of the first difference image or the second difference image.

8. The apparatus of claim 6, wherein the program instructions when executed are further configured to:
- select surrounding areas m, x and n of the pixel selected from the difference map of the first difference image and the second difference image; and
- detect the obstacle from the selected area.

9. A method for detecting an obstacle, comprising:
- compensating, by a controller, a position of a second image based on a first image based on a moving distance of a vehicle between the first image and the second image captured at different times;
- generating, by the controller, a first difference image based on a difference between the first image and the second image;
- generating, by the controller, a second difference image based on a difference between the first image and the second image in which the position is compensated;
- generating, by the controller, a difference map for each of the first difference image and the second difference image;
- performing, by the controller, binarization of the first difference image and the second difference image based on a difference value of the difference map;
- performing, by the controller, an AND operation for a bit value of two corresponding pixels in the binarization image of the first difference image and the second difference image and generating a synthetic image for the binarization image;
- extracting, by the controller, an area in which the bit value is 1 in the synthetic image; and
- detecting, by the controller, the obstacle by selecting a pixel that corresponds to the extracted area in the difference map of the first difference image or the second difference image.

10. A non-transitory computer readable medium containing program instructions executed by a controller, the computer readable medium comprising:
- program instructions that compensate a position of a second image based on a first image based on a moving distance of a vehicle between the first image and the second image captured at different times;
- program instructions that generate a first difference image based on a difference between the first image and the second image;
- program instructions that generate a second difference image based on a difference between the first image and the second image in which the position is compensated;
- program instructions that generate a difference map for each of the first difference image and the second difference image;
- program instructions that perform binarization of the first difference image and the second difference image based on a difference value of the difference map;
- program instructions that perform an AND operation for a bit value of two corresponding pixels in the binarization image of the first difference image and the second difference image and generating a synthetic image for the binarization image;
- program instructions that extract an area in which the bit value is 1 in the synthetic image; and
- program instructions that detect the obstacle by selecting a pixel that corresponds to the extracted area in the difference map of the first difference image or the second difference image.

* * * * *